United States Patent
Park et al.

(10) Patent No.: US 7,029,520 B2
(45) Date of Patent: Apr. 18, 2006

(54) DUST COLLECTING APPARATUS FOR AN AIR CONDITIONER

(75) Inventors: Chan-jung Park, Suwon (KR); Young-saeng Kim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 153 days.

(21) Appl. No.: 10/672,063

(22) Filed: Sep. 29, 2003

(65) Prior Publication Data

US 2004/0129140 A1 Jul. 8, 2004

(30) Foreign Application Priority Data

Dec. 23, 2002 (KR) .................. 10-2002-0082684

(51) Int. Cl.
*B03C 3/155* (2006.01)

(52) U.S. Cl. ...................... 96/66; 55/525; 55/527; 96/69

(58) Field of Classification Search .............. 96/59, 96/65–67, 69, 96, 97; 55/525, 527

See application file for complete search history.

(56) References Cited

U.S. PATENT DOCUMENTS

| | | | | |
|---|---|---|---|---|
| 2,822,058 A | * | 2/1958 | Roos et al. .................. 96/66 |
| 4,938,786 A | * | 7/1990 | Tonomoto .................. 96/17 |
| 5,055,115 A | * | 10/1991 | Yikai et al. .................. 96/59 |
| 5,290,343 A | * | 3/1994 | Morita et al. ................ 96/39 |
| 5,403,383 A | * | 4/1995 | Jaisinghani .................. 95/69 |
| 5,433,772 A | * | 7/1995 | Sikora ...................... 96/87 |
| 5,456,741 A | * | 10/1995 | Takahara et al. ............. 96/22 |
| 5,474,599 A | * | 12/1995 | Cheney et al. ............... 96/55 |
| 5,582,632 A | * | 12/1996 | Nohr et al. .................. 95/78 |
| 5,855,653 A | * | 1/1999 | Yamamoto .................. 96/58 |
| 5,904,896 A | * | 5/1999 | High ....................... 422/4 |
| 6,221,136 B1 | * | 4/2001 | Liu et al. .................... 96/66 |
| 6,231,643 B1 | * | 5/2001 | Pasic et al. .................. 95/75 |
| 6,585,803 B1 | * | 7/2003 | Chang et al. ................ 95/70 |
| 6,602,330 B1 | * | 8/2003 | Allen ....................... 96/58 |

FOREIGN PATENT DOCUMENTS

JP     53-130578    * 11/1978 ............... 96/59

OTHER PUBLICATIONS

Japanese Abstract 09-150076 dated Jun. 10, 1997.
Japanese Abstract 11-156239 dated Jun. 15, 1999.

* cited by examiner

*Primary Examiner*—Richard L. Chiesa
(74) *Attorney, Agent, or Firm*—Staas & Halsey LLP (57) ABSTRACT

A dust collecting apparatus for an air conditioner, including an ionizer to electrically charge dust particles in air; and a metal filter having fine metal fibers, disposed at a predetermined distance from a back of the ionizer, the metal filter having a polarity opposite to that of the charged dust particles to electrically collect the dust particles.

41 Claims, 6 Drawing Sheets

FIG. 1

PRIOR ART

FIG. 2

PRIOR ART

DUST COLLECTING APPARATUS FOR AN AIR CONDITIONER

CROSS-REFERENCE TO RELATED APPLICATIONS

This application claims the benefit of Korean Patent Application No. 2002-82684, filed Dec. 23, 2002, in the Korean Intellectual Property Office, the disclosure of which is incorporated herein by reference.

BACKGROUND OF THE INVENTION

1. Field of the Invention

The present invention relates to a dust collecting apparatus for use in an air conditioner that includes an ionizer to electrically charge dust particles in air and a metal filter having fine metal fibers disposed at a predetermined interval from a back of the ionizer, in which the metal filter has a polarity opposite to that of the charged dust particles to electrically collect the dust particles.

2. Description of the Related Art

As is well known to those skilled in the art, an inorganic or synthetic fiber filter or an electric collection filter having an ionizer and a collector has been used to collect dust in an air conditioner, in which the inorganic or synthetic fiber filter is formed of natural fibers, glass fibers, or various synthetic resin fibers.

However, the inorganic or synthetic fiber filter formed of natural fibers, glass fibers, or various synthetic resin fibers may be damaged under severe conditions including high temperatures, high pressures, and high wind velocities, and involves some risk. Further, this type of filter is disadvantageous in that it is discarded following use for a predetermined period of time. Accordingly, additional cost is required to manage and ultimately dispose of the above filter. In addition, the environment is contaminated due to the discarded filter.

Figure 1:
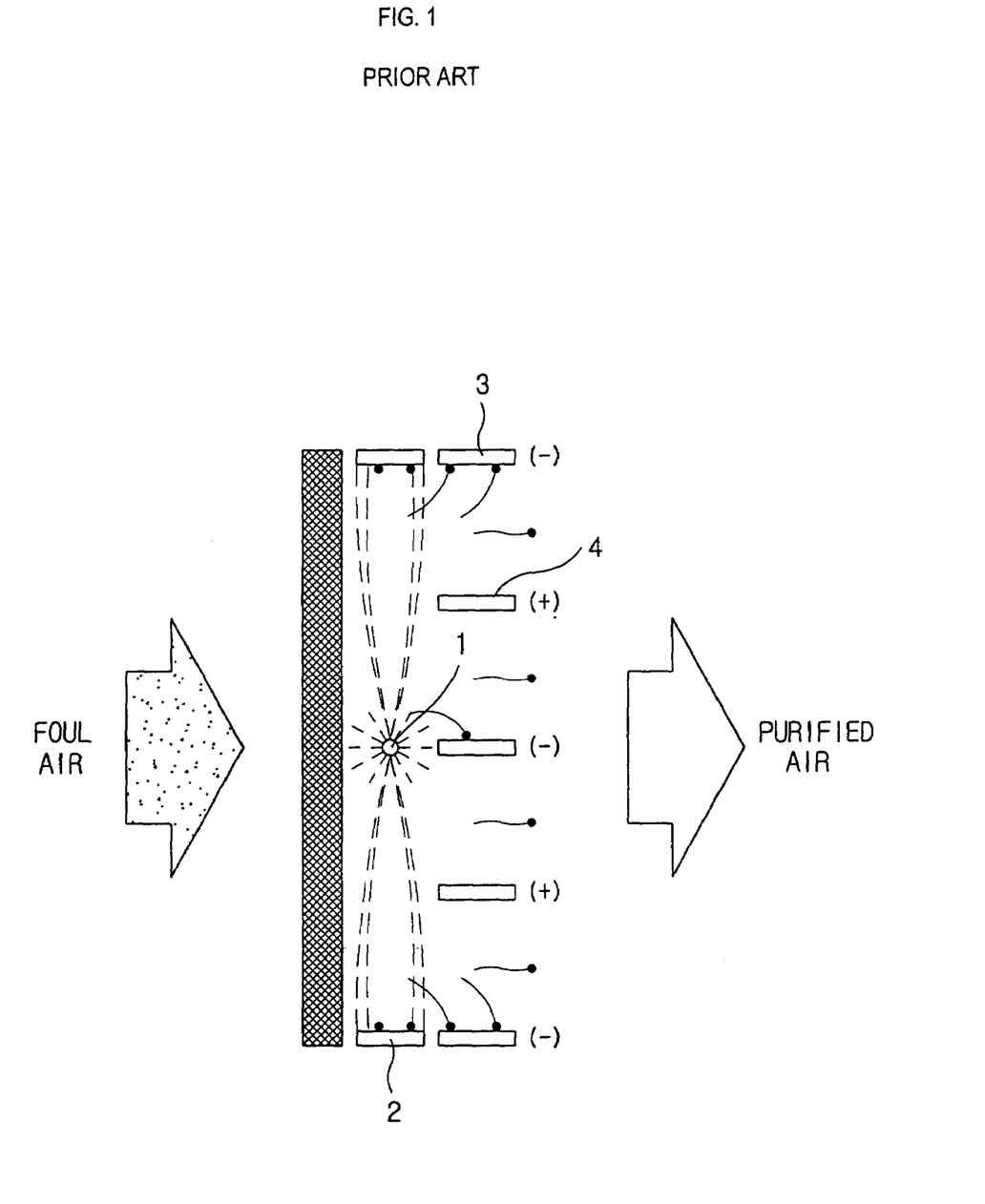
FIG. 1 illustrates a conventional dust collecting apparatus of an air conditioner.

FIG. 1 illustrates a conventional dust collecting apparatus of an air conditioner. As shown in FIG. 1, the dust collecting apparatus includes an ionizer having discharge electrodes 1 and ground electrodes 2. In the ionizer, when high voltage is applied to the discharge electrodes 1, corona discharge occurs between the discharge electrodes 1 and the ground electrodes 2, resulting in dust particles in air drawn into the air conditioner being electrically ionized. When the ionized dust particles pass through a collector having grounded collecting plates 3 and accelerating electrode plates 4, to which a high voltage is applied, the dust particles are collected onto the grounded collecting plates 3 by the strength of the electric field generated between two polar plates (i.e., the grounded collecting plate 3 and the accelerating electrode plate 4).

The collection efficiency of the collector increases as the area of the collecting plate 3 increases, the flow rate of the dust particles increases, or the space between the two polar plates in the collector decreases. The collection efficiency decreases as an amount of flowing air increases or a flow rate of air passing through the filter increases.

Figure 2:
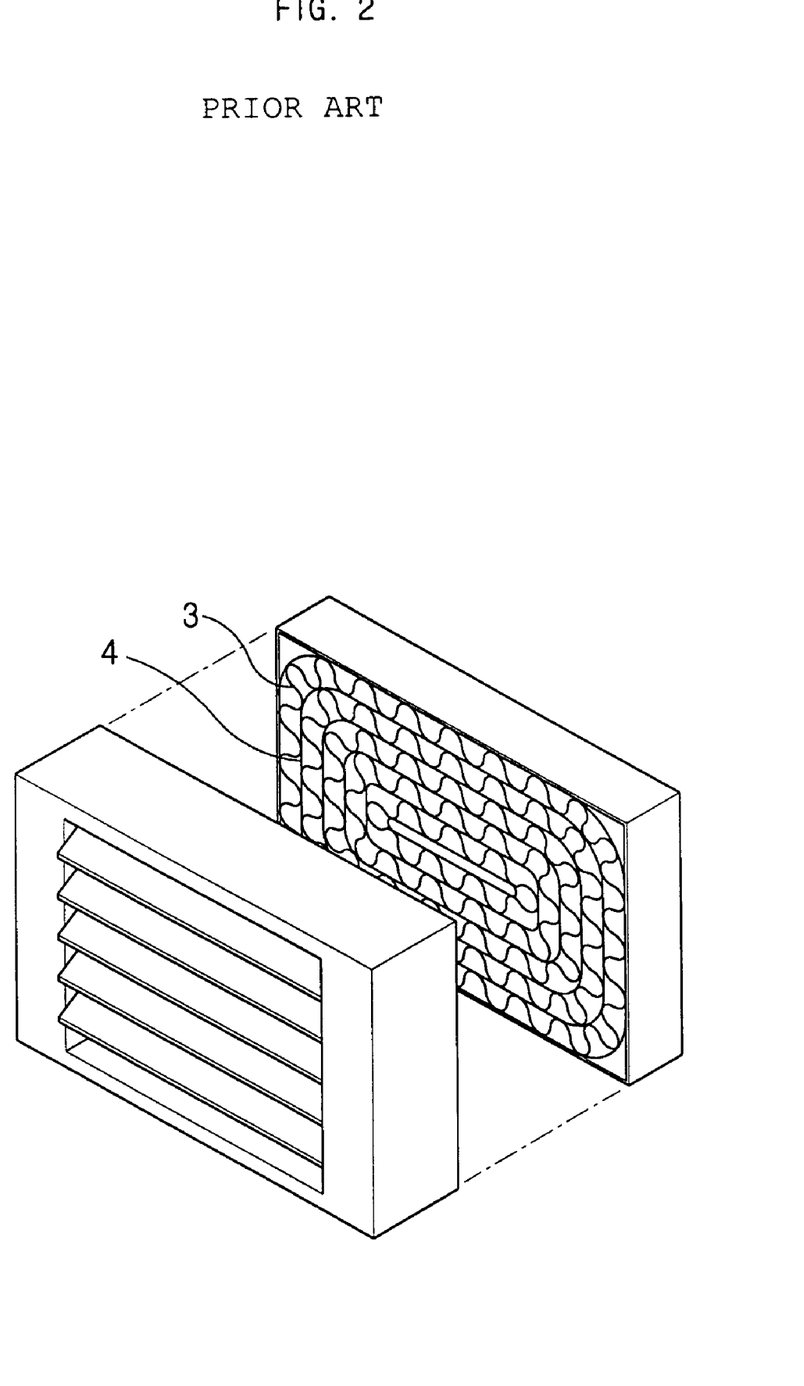
FIG. 2 illustrates another conventional dust collecting apparatus of an air conditioner.

FIG. 2 illustrates another conventional dust collecting apparatus (i.e., a dust collection filter) in an air conditioner, which is used to enhance dust collection efficiency by increasing the surface area of a collecting plate. As shown in FIG. 2, a collecting plate 3 made of aluminum foil is formed into a wave-shaped band, and is attached to an accelerating electrode plate 4, after which the collecting plate 3 and the accelerating electrode plate 4 are wound to form a coil-shaped collector.

The collection efficiency of the conventional dust collecting filter of FIG. 2 drastically decreases as the widths of the collecting plate 3 and the accelerating electrode plate 4 decrease as dust passes through the collecting filter at a constant flow rate. Hence, the width of each collecting plate 3 should be increased, which increase the total volume of the air conditioner. Thus, it is difficult to fabricate a compact air conditioner. In addition, because each collecting plate 3 has a wave shape to maintain a constant space between the collecting plate 3 and the accelerating electrode plate 4, dust does not attach to the collecting plate 3, but, rather, passes between the waves at fast flow rates, thus drastically decreasing the collection efficiency.

Further, the collector of FIG. 2 has a complicated structure because the metal collecting plate made of aluminum foil and the accelerating electrode plate, to which high voltage is applied, are provided separately in the collector. With the aim of increasing the surface area of the collecting plate, a plurality of collecting plates 3 should be provided, whereby a space between each collecting plate 3 and accelerating electrode plate 4 decreases. However, in such a case, arc-discharge is generated between each collecting plate 3 and accelerating electrode plate 4 by application of the high voltage, which inversely charges and again scatters the collected dust particles.

In the case of the coil-shaped collector of FIG. 2 having the collecting plate 3 and the accelerating electrode plate 4 wound together to increase the surface area of the collecting plate 3, the collector has a large volume and weight in the air conditioner. Also, because the collecting plate 3 is not easily separated from the accelerating electrode plate 4, it is difficult to wash the collecting plate 3 separately. Therefore, limitations are imposed on recycling the collecting plate 3 by a back washing process.

On the other hand, the metal plate made of aluminum foil in the collector of FIG. 2 exhibits a dust collecting function only through ionization. Dust particles that are not ionized in the ionizer (not shown) are not filtered by the collector, and thus the collection efficiency becomes low.

Moreover, the conventional dust collecting apparatus of FIG. 1 or FIG. 2 has a drawback of low collection efficiency when the ionizer is not operating properly. That is, when the ionizer is not operating properly, dust particles are not electrically charged and pass through the collector without being collected.

Contained in air drawn into a suction port (not shown) are dust particles as well as offensive odors or VOCs (Volatile Organic Compounds: aromatic compounds, alcohols, hydrocarbons, organic acids, ketones, aldehydes) that are not entirely removed by the above dust collecting filter. Therefore, the conventional dust collecting apparatus has an additional disadvantage in that an additional filtering apparatus is required.

SUMMARY OF THE INVENTION

It is an aspect of the present invention to provide a dust collecting apparatus for use in an air conditioner, including an ionizer to electrically charge dust particles in air and a metal filter having fine metal fibers disposed at a predetermined interval from a back of the ionizer, the metal filter being electrically charged to have a polarity opposite that of the charged dust particles to electrically collect the dust particles.

It is another aspect of the present invention to provide a dust collecting apparatus for use in an air conditioner, including an ionizer to electrically charge dust particles in air, a metal filter having fine metal fibers disposed at a predetermined interval from a back of the ionizer, and an electrostatic filter disposed between the ionizer and the metal filter to generate static electricity, the metal filter being electrically charged to have a polarity opposite to that of the charged dust particles to electrically collect the dust particles.

Additional aspects and/or advantages of the invention will be set forth in part in the description that follows and, in part, will be obvious from the description, or may be learned by practice of the invention.

To achieve the above and/or other aspects of the present invention, there is provided a dust collecting apparatus for use in an air conditioner, including an ionizer to electrically charge dust particles in air; and a metal filter having fine metal fibers, disposed at a predetermined distance from a back of the ionizer, the metal filter having a polarity opposite to that of the charged dust particles to electrically collect the dust particles.

The metal fibers sterilize, remove odors from air, remove VOCs from air, or any combination thereof.

In addition, a surface of the metal filter is coated with silver (Ag) nanoparticles.

The dust collecting apparatus further includes a mesh metal filter in front of or behind the metal filter.

To achieve the above and/or other aspects of the present invention, there is provided a dust collecting apparatus for use in an air conditioner, including an ionizer to electrically charge dust particles in air; a metal filter having fine metal fibers, disposed at a predetermined distance from a back of the ionizer; and an electrostatic filter generating static electricity, disposed between the ionizer and the metal filter, wherein the metal filter has a polarity opposite to that of the charged dust particles to electrically collect the dust particles.

As discussed above, the metal fibers sterilize, remove odors from air, remove VOCs from air, or any combination thereof.

Also, as discussed above, a surface of the metal filter is coated with silver (Ag) nanoparticles.

Moreover, the dust collecting apparatus further includes a mesh metal filter in front of or behind the metal filter.

To achieve the above and/or other aspects according to the present invention, there is provided a dust collecting apparatus for an air conditioner having an ionizer to electrically charge dust particles in air, the dust collecting apparatus including a metal filter, wherein the metal filter has a polarity opposite to that of the charged dust particles to electrically collect the dust particles, and wherein the metal filter includes a plurality of metal fibers with very narrow gaps therebetween to collect the dust particles using mechanical force, regardless of whether the ionizer is operating properly.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiment, taken in conjunction with the accompanying drawings, of which.

DESCRIPTION OF THE PREFERRED EMBODIMENT

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 3A:
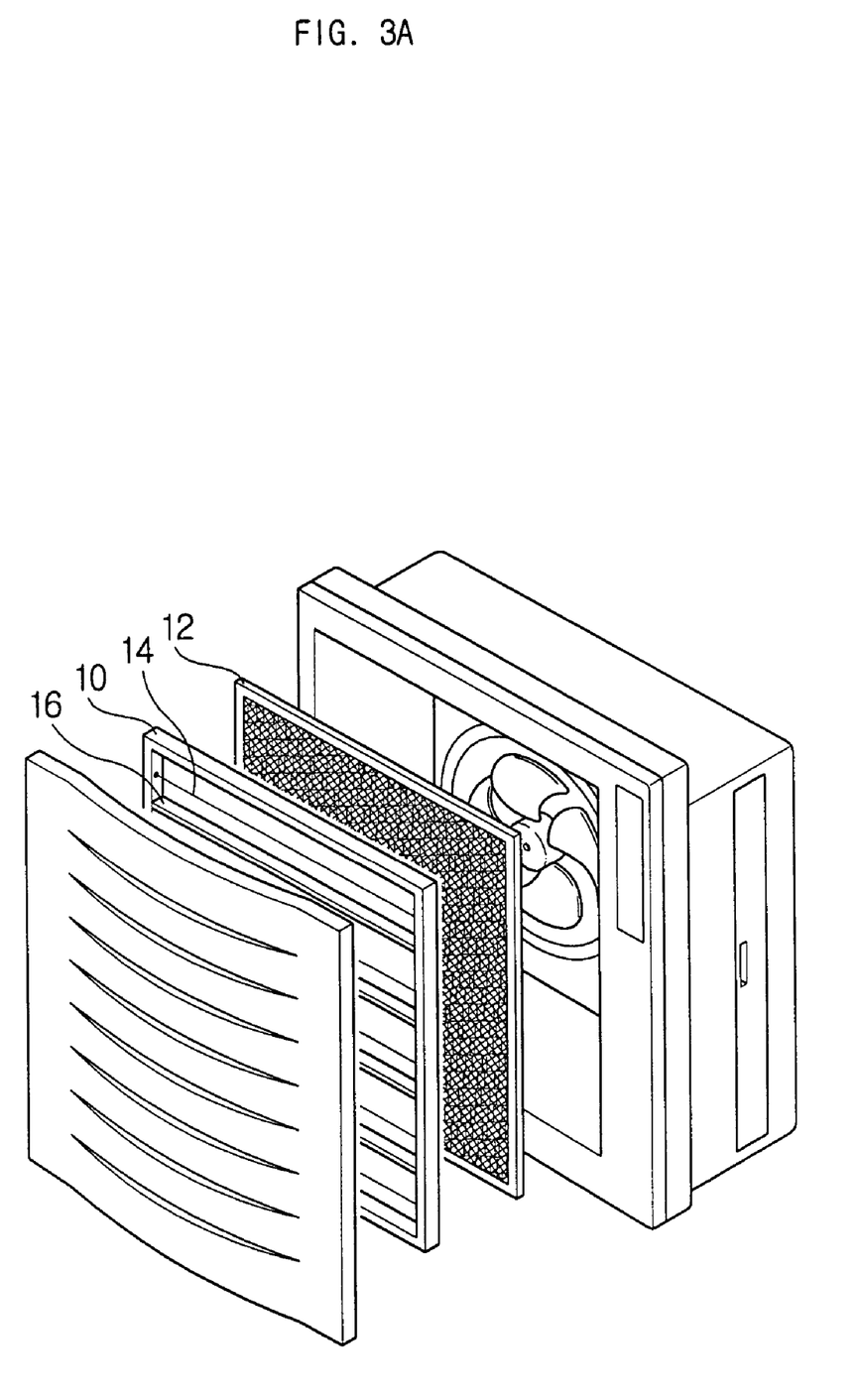
FIG. 3A illustrates a dust collecting apparatus of an air conditioner, according to an embodiment of the present invention.

FIG. 3A illustrates a dust collecting apparatus of an air conditioner, according to an embodiment of the present invention. As shown in FIG. 3A, the dust collecting apparatus includes an ionizer 10 and a metal fiber filter 12, which are sequentially disposed behind a suction port (not shown) that draws air. The ionizer 10 electrically charges dust particles, and the metal fiber filter 12 is disposed at a predetermined interval from a back of the ionizer 10.

The ionizer 10 has a discharge electrode 14 and ground electrodes 16 positioned at either side of the discharge electrode 14, in which the dust particles are ionized while corona discharge occurs between the discharge electrode 14 and the ground electrodes 16 by the application of a high voltage to the discharge electrode 14.

The ionizer 10 may be a wire brush type of ionizer having a wire-shaped discharge electrode (not shown) to which high voltage is applied, and ground electrodes (not shown) cylindrically surrounding the wire-shaped discharge electrode to increase an ionizing area of inflow air.

In the ionizer 10, electric discharge is generated in all directions, and electrically charged regions of external dust particles are broad, resulting in an increase in collection efficiency of about 10%. Further, the discharge electrode 14 applied with high voltage is surrounded by a grounded cylinder (not shown), and, thus the ionizer 10 is electrically stable.

The ionizer 10 may include ground electrodes that are spaced apart and parallel to the air stream, and a needle-shaped discharge electrode, having sharp saw-tooth shaped needles, which is disposed between the ground electrodes and applied with a high voltage.

The dust particles ionized in the ionizer 10 are electrically collected onto the metal fiber filter 12 having a polarity opposite to that of the ionized dust particles. In addition, metal fibers (not shown) in the metal fiber filter 12 have very narrow gaps between the metal fibers, and thus the metal fiber filter 12 exhibits electrical force as well as mechanical force (for example, collision and inertia), to collect the dust particles onto the metal fiber filter 12.

Figure 4:
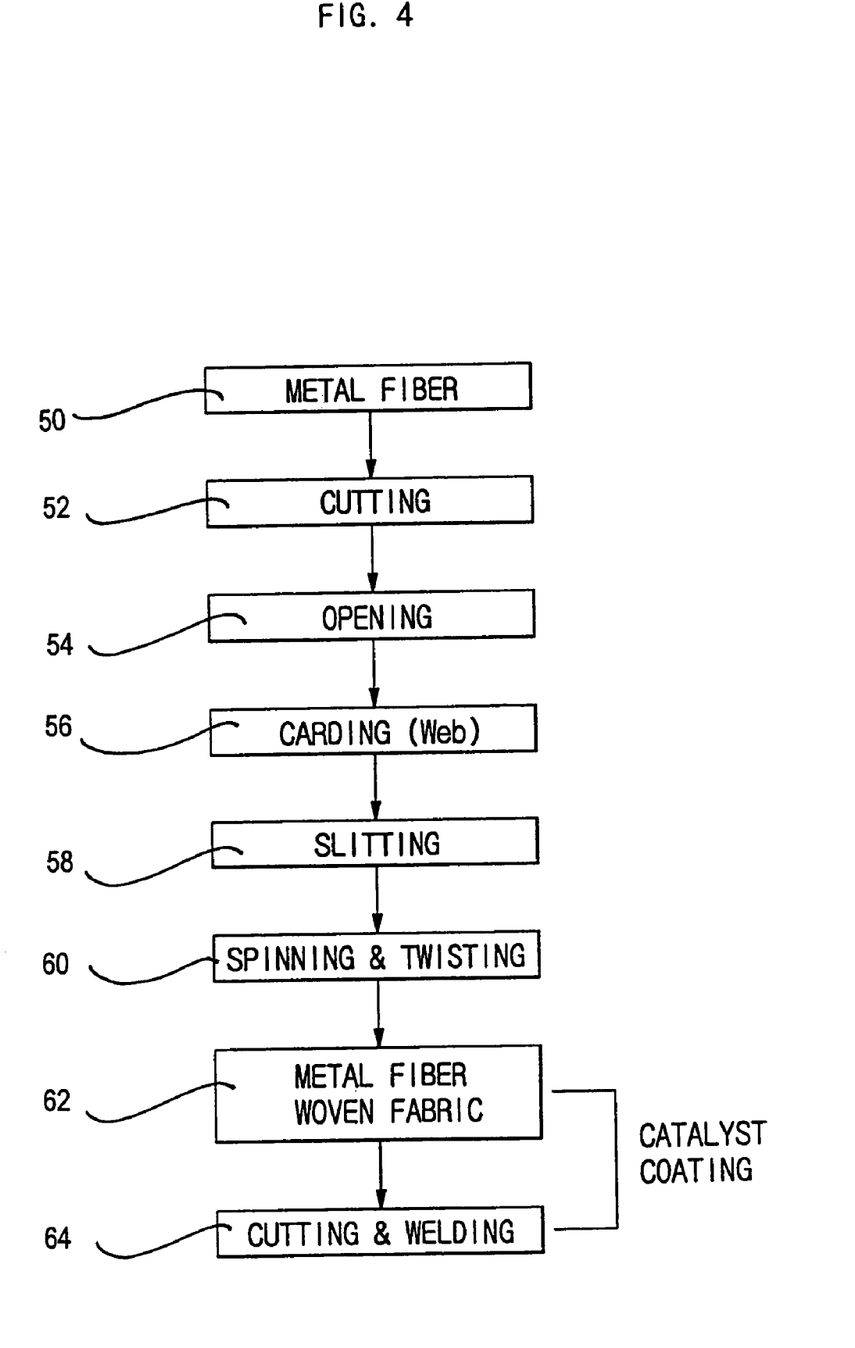
FIG. 4 is a flowchart of a process of preparing a metal fiber filter of the dust collecting apparatus, according to the present invention.

FIG. 4 illustrates a process of preparing the metal fiber filter 12 according to the present invention. As shown in FIG. 4, at least one type of metal is processed into ultra-fine metal fibers at operation 50, which are subjected to a series of processes of cutting at operation 52, opening at operation 54 (fiber clumps are opened by a blowing and opening process), carding at operation 56, slitting at operation 58, and spinning and weaving at operation 60, thereby forming a metal fiber woven fabric at operation 62, which undergoes cutting and welding at operation 64 to form the metal fiber filter 12.

The metal fibers are selected from among silver (Ag), aluminum (Al), copper (Cu), iron (Fe), zinc (Zn), cadmium (Cd), palladium (Pd), rhodium (Rh), and chrome (Cr), which operate to sterilize inflow air; copper (Cu), platinum (Pt), and nickel (Ni), which operate to remove VOCs from air; titanium oxide ($TiO_2$), vanadium (V), zinc (Zn), and gold (Au), which operate to remove odors from air; or mixtures thereof, resulting in the metal fibers exhibiting a dust collecting operation as well as a sterilizing operation.

A surface of the metal fiber filter 12 is coated with one of the above metals having a nanometer-scale particle size, such as silver (Ag), to perform the above operations.

A mesh metal filter (not shown) may be provided in front of or behind the metal fiber filter 12 to support the metal fiber filter 12. The mesh metal filter, serving as a pre-filter, acts primarily to collect dust electrostatically via electric force.

Figure 3B:
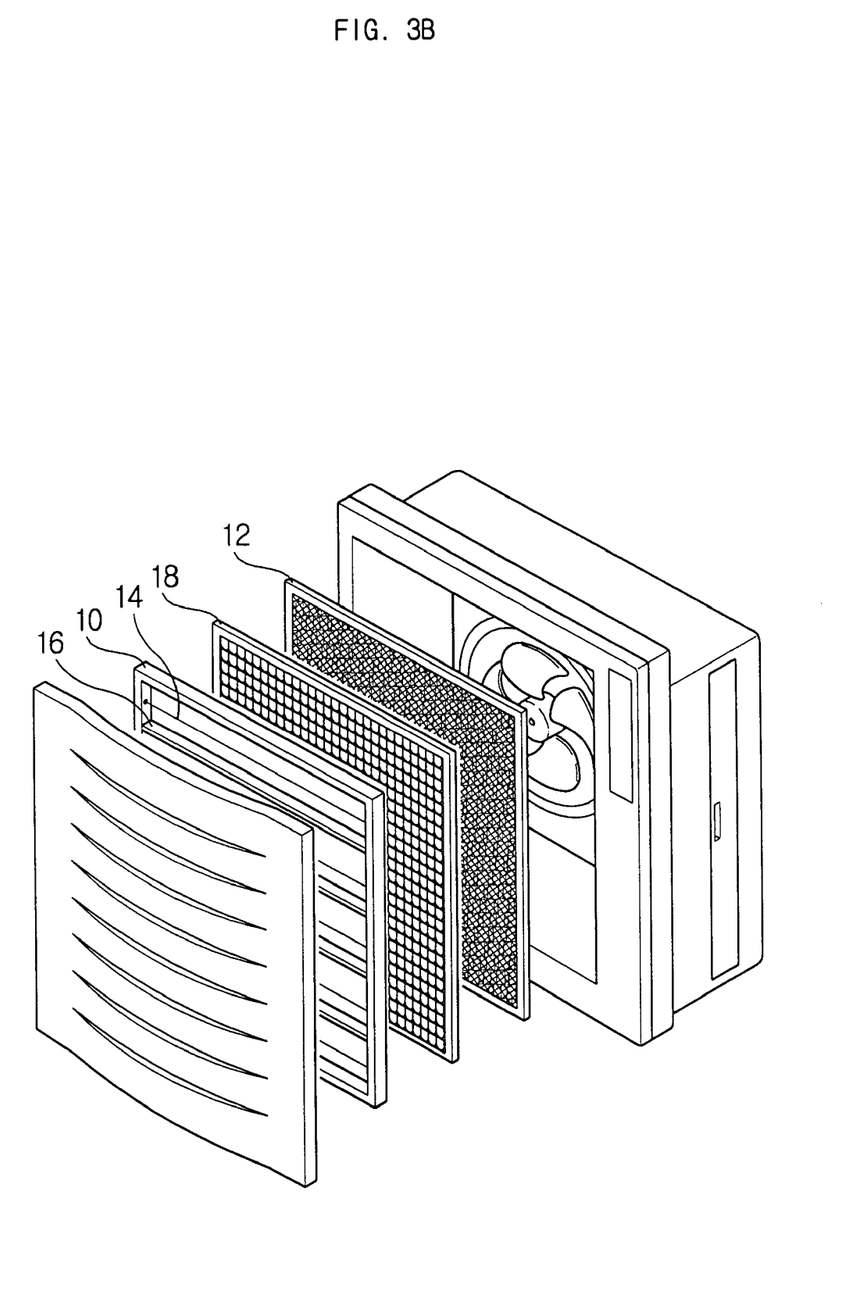
FIG. 3B illustrates the dust collecting apparatus of FIG. 3A with an electrostatic filter.

Further, an electrostatic filter 18 (see FIG. 3B) capable of generating static electricity is provided either between the ionizer 10 and the metal fiber filter 12, or in front of or behind the dust collecting apparatus of the present invention, to increase collection efficiency.

Furthermore, a HEPA (High Effective Particulate Air) filter (not shown) or an ULPA (Ultra Low Penetrate Air) filter (not shown) may be provided at a front or a back of the dust collecting apparatus, according to the present invention, or between the ionizer 10 and the metal fiber filter 12. The HEPA filter is a dry filter having a collection efficiency of about 99.9% or more with respect to particles having a particle size of about 0.3 mm or larger, while the ULPA filter has a super-high collection efficiency of about 99.999% with respect to particles having a particle size of about 0.12 mm or larger.

Figure 5:
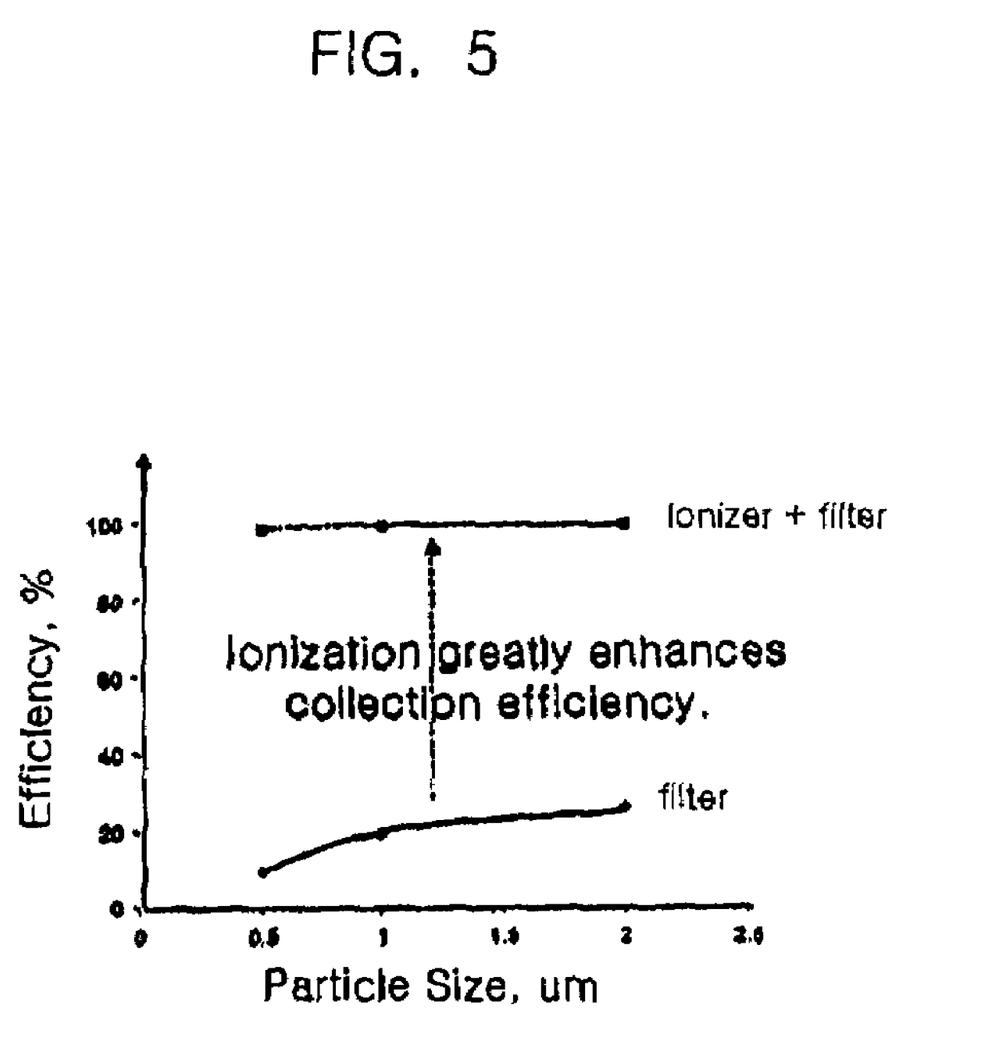
FIG. 5 is a graph illustrating collection efficiency of the metal fiber filter combined with an ionizer, according to the present invention.

FIG. 5 illustrates the collection efficiency of the metal fiber filter 12 combined with the ionizer 10. Table 1, below, shows a comparison of a general metal mesh filter and the metal fiber filter 12 of the present invention, with respect to particles of about 0.3 mm at a flow rate of about 0.5 m/s. In Table 1, Experiment 1 (Exp. 1) shows results according to the ASHRAE 52.2-1999 standard using the general metal mesh filter and the metal fiber filter 12, and Experiment 2 (Exp. 2) shows results according to the ASHRAE 52.2-1999 standard, under conditions of applying 5.2 kV to a tungsten wire of an ionizer and 0 V to a ground electrode and a metal fiber filter.

TABLE 1

|  | General Metal Mesh Filter | Inventive Metal Fiber Filter |
|---|---|---|
| Exp. 1: Collection Efficiency Dioctyl Phthalate(DOP) Test | 1.5% | 4.3% |

TABLE 1-continued

|  | General Metal Mesh Filter | Inventive Metal Fiber Filter |
|---|---|---|
| Exp. 2: Collection Efficiency With Ionizer (DOP Test) | 27.7% | 60.9% |

Below, Table 2 shows collection efficiencies of a metal fiber filter, an electrostatic filter, a combination of a metal fiber filter and an electrostatic filter, a combination of an ionizer and a metal fiber filter, and a combination of an ionizer, a metal fiber filter and an electrostatic filter, under the same conditions as those of Experiment 1 of Table 1 above. The metal fiber filter of the present invention collects dust even when the ionizer does not operate properly. When the metal filter is used with the electrostatic filter, collection efficiency of a desired level or greater is obtained. Further, when the ionizer, electrostatic filter, and the metal fiber filter are combined, collection efficiency is similar to that of the HEPA filter.

TABLE 2

|  | Metal Filter | Electro. Filter | Electro. Filter + Metal Filter | Ionizer + Metal Filter | Ionizer + Electro. Filter + Metal Filter |
|---|---|---|---|---|---|
| Collection Efficiency (%) | 4.3 | 7.9 | 18.7 | 60.9 | 98.7 |

As described above, the dust collecting apparatus of the present invention does not have the complicated structure of a collecting plate 3 and an accelerating electrode plate 4 adhered to one another integrally. Rather, the dust collecting apparatus of the present invention has a simple structure with the metal fiber filter 12 containing fine metal fibers having a polarity opposite to that of the ionized particles, while exhibiting high collection efficiency.

Also, the metal fiber filter 12 is reused using a simple back washing process, for example, in which the metal fiber filter 12 is detached from the dust collecting apparatus and washed with water to remove the adsorbed dust. Therefore, there is no need to frequently replace the filter with a new filter, providing economic benefits. Further, the metal filter has high collection efficiency in removing the dust particles, and thus service life of the HEPA filter is increased.

The conventional dust collecting apparatus has a drawback of low collection efficiency upon breakdown of the ionizer. In contrast, the metal fiber filter 12 of the present invention exhibits a dust collecting operation by electrical force, as well as by mechanical force, even when the ionizer 10 does not operate properly. In particular, when the metal fiber filter 12 is used with the electrostatic filter, collection efficiency of a desired level or greater may be obtained. Additionally, the collection efficiency of the combination of the ionizer 10, the metal fiber filter 12, and the electrostatic filter is similar to that of the HEPA filter.

The dust collecting apparatus of the present invention does not require an increase in the surface area of the collecting plate 3. That is, the width of the collecting plate 3 does not need to be increased, and the collecting plate 3 and the accelerating electrode plate 4 need not be adhered together and then manipulated to form a coil-shaped collector. Thus, the volume and the size of the dust collecting filter in the air conditioner remain relatively small, resulting in fabrication of a compact air conditioner.

In addition to a dust collecting operation by electrical force, the metal fiber filter 12 removes ionized dust particles, as well as non-ionized dust particles, by collision, interfering force, diffusing force, or gravitational force, due to the very narrow gaps between the metal fibers, thus increasing collection efficiency.

Further, the metal fibers of the metal fiber filter 12 sterilize inflow air, remove VOCs from air, remove odors from air, or any combination thereof. Therefore, the metal fiber filter 12 exhibits a dust collecting operation, as well as a sterilizing function, without use of an additional apparatus or filter.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A dust collecting apparatus for an air conditioner, comprising:
   an ionizer to electrically charge dust particles in air; and
   a metal filter having a plurality of metal fibers, disposed at a predetermined distance from a back of the ionizer, the metal filter having a polarity opposite to that of the charged dust particles to electrically collect the dust particles, and the metal fibers of the metal filter having gaps sufficiently narrow therebetween to provide electrical force and mechanical force to collect the dust particles onto the metal filter.

2. The dust collecting apparatus of claim 1, wherein electric discharge is generated in the ionizer in all directions, electrically charging broad regions of external dust particles to increase collection efficiency by about 10%.

3. The dust collecting apparatus of claim 1, wherein the ionizer comprises:
   a discharge electrode; and
   a plurality of ground electrodes positioned at either side of the discharge electrode,
   wherein the dust particles are ionized while corona discharge occurs between the discharge electrode and the ground electrodes by application of a sufficiently high voltage to the discharge electrode.

4. The dust collecting apparatus of claim 3, wherein the ionizer is a wire brush type of ionizer having a wire-shaped discharge electrode to which the high voltage is applied, and ground electrodes cylindrically surrounding the wire-shaped discharge electrode to increase an ionizing area of inflow air.

5. The dust collecting apparatus of claim 3, wherein the ground electrodes of the ionizer are spaced apart a predetermined distance and parallel to an air stream, and the discharge electrode is a needle-shaped discharge electrode that is disposed between the ground electrodes.

6. The dust collecting apparatus of claim 1, wherein one of the metal fibers of the metal filter performs an air sterilization operation.

7. The dust collecting apparatus of claim 6, wherein the metal fiber performing the air sterilization operation is a material selected from the group consisting of silver (Ag), aluminum (Al), copper (Cu), iron (Fe), zinc (Zn), cadmium (Cd), palladium (Pd), rhodium (Rh), and chrome (Cr).

8. The dust collecting apparatus as defined in claim 6, wherein one of the metal fibers of the metal filter removes odors from air.

9. The dust collecting apparatus as defined in claim 6, wherein one of the metal fibers of the metal filter removes volatile organic compounds (VOCs) from air.

10. The dust collecting apparatus of claim 9, wherein the metal fiber that removes the VOCs is a material selected from the group consisting of copper (Cu), platinum (Pt), and nickel (Ni).

11. The dust collecting apparatus of claim 9, wherein one of the metal fibers of the metal filter removes odors from the air.

12. The dust collecting apparatus of claim 11, wherein the metal fiber that removes odors is a material selected from the group consisting of titanium oxide ($TiO_2$), vanadium (V), zinc (Zn), and gold (Au).

13. The dust collecting apparatus of claim 1, wherein one of the metal fibers of the metal filter removes volatile organic compounds (VOCs) from the air.

14. The dust collecting apparatus of claim 13, wherein the metal fiber that removes the VOCs is a material selected from the group consisting of copper (Cu), platinum (Pt), and nickel (Ni).

15. The dust collecting apparatus of claim 13, wherein one of the metal fibers of the metal filter removes odors from the air.

16. The dust collecting apparatus of claim 15, wherein the metal fiber that removes odors is a material selected from the group consisting of titanium oxide ($TiO_2$), vanadium (V), zinc (Zn), and gold (Au).

17. The dust collecting apparatus of claim 1, wherein one of the metal fibers of the metal filter removes odors from the air.

18. The dust collecting apparatus of claim 1, wherein a surface of the metal filter is coated with silver (Ag) nanoparticles.

19. The dust collecting apparatus as defined in claim 18, further comprising a mesh metal filter disposed in front of or behind the metal filter.

20. The dust collecting apparatus of claim 1, further comprising a mesh metal filter disposed in front of or behind the metal filter to support the metal filter.

21. The dust collecting apparatus as defined in claim 1, wherein the metal filter is in a form of a sheet by compressing open the metal fibers.

22. A dust collecting apparatus for an air conditioner, comprising:
   an ionizer to electrically charge dust particles in air;
   a metal filter having a plurality of metal fibers, disposed at a predetermined distance from a back of the ionizer; and
   an electrostatic filter generating static electricity, disposed between the ionizer and the metal filter,
   wherein the metal filter has a polarity opposite to that of the charged dust particles to electrically collect the dust particles.

23. The dust collecting apparatus of claim 22, wherein one of the metal fibers of the metal filter performs an air sterilization operation.

24. The dust collecting apparatus of claim 23, wherein the metal fiber performing the air sterilization operation is a material selected from the group consisting of silver (Ag), aluminum (Al), copper (Cu), iron (Fe), zinc (Zn), cadmium (Cd), palladium (Pd), rhodium (Rh), and chrome (Cr).

25. The dust collecting apparatus as defined in claim 23, wherein one of the metal fibers of the metal filter removes volatile organic compounds (VOCs) from air.

26. The dust collecting apparatus as defined in claim 23, wherein one of the metal fibers of the metal filter removes odors from air.

27. The dust collecting apparatus of claim 22, wherein one of the metal fibers of the metal filter removes volatile organic compounds (VOCs) from the air.

28. The dust collecting apparatus of claim 27, wherein the metal fiber that removes the VOCs is a material selected from the group consisting of copper (Cu), platinum (Pt), and nickel (Ni).

29. The dust collecting apparatus of claim 27, wherein one of the metal fibers of the metal filter removes odors from the air.

30. The dust collecting apparatus of claim 29, wherein the metal fiber that removes odors is a material selected from the group consisting of titanium oxide ($TiO_2$), vanadium (V), zinc (Zn), and gold (Au).

31. The dust collecting apparatus of claim 22, wherein one of the metal fibers of the metal filter removes odors from the air.

32. The dust collecting apparatus of claim 22, wherein a surface of the metal filter is coated with silver (Ag) nanoparticles.

33. The dust collecting apparatus as defined in claim 32, further comprising a mesh metal filter disposed in front of or behind the metal filter.

34. The dust collecting apparatus of claim 22, further comprising a mesh metal filter disposed in front of or behind the metal filter to support the metal filter.

35. The dust collecting apparatus of claim 22, wherein the metal filter is formed as a sheet by compressing open the metal fibers.

36. The dust collecting apparatus of claim 25, wherein the metal fiber that removes the VOCs is a material selected from the group consisting of copper (Cu), platinum (Pt), and nickel (Ni).

37. The dust collecting apparatus of claim 25, wherein one of the metal fibers of the metal filter removes odors from the air.

38. The dust collecting apparatus of claim 37, wherein the metal fiber that removes odors is a material selected from the group consisting of titanium oxide ($TiO_2$), vanadium (V), zinc (Zn), and gold (Au).

39. An air cleaner having a dust collecting apparatus, the dust collecting apparatus comprising:
an ionizer to electrically charge dust particles in air; and
a metal filter having a plurality of metal fibers, disposed at a predetermined distance from a back of the ionizer, the metal filter having a polarity opposite to that of the charged dust particles to electrically collect the dust particles, and the plurality of metal fibers having gaps sufficiently narrow therebetween to collect the dust particles using mechanical force, regardless of whether the ionizer is operating properly.

40. An air cleaner having a dust collecting apparatus, the dust collecting apparatus comprising:
an ionizer to electrically charge dust particles in air;
a metal filter having a plurality of metal fibers, disposed at a predetermined distance from a back of the ionizer; and
an electrostatic filter generating static electricity, disposed between the ionizer and the metal filter,
wherein the metal filter has a polarity opposite to that of the charged dust particles to electrically collect the dust particles.

41. A dust collecting apparatus for an air conditioner having an ionizer to electrically charge dust particles in air, the dust collecting apparatus comprising a metal filter,
wherein the metal filter has a polarity opposite to that of the charged dust particles to electrically collect the dust particles, and
wherein the metal filter comprises a plurality of metal fibers with gaps sufficiently narrow therebetween to collect the dust particles using mechanical force, regardless of whether the ionizer is operating properly.

* * * * *